Figure 1:
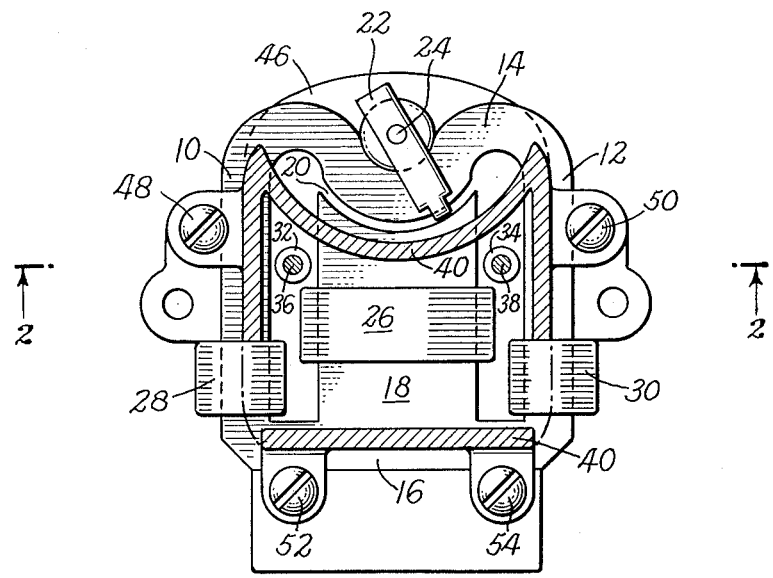

April 25, 1961    G. SMITH    2,981,909

POSITION MEASURING APPARATUS

Filed Oct. 15, 1957

INVENTOR
Graydon Smith
BY
Curtis Morris & Safford
ATTORNEYS

United States Patent Office 2,981,909
Patented Apr. 25, 1961

2,981,909
POSITION MEASURING APPARATUS

Graydon Smith, Concord, Mass., assignor, by mesne assignments, to Clevite Corporation Filed Oct. 15, 1957, Ser. No. 690,362

5 Claims. (Cl. 336—30)

This invention relates to position measuring apparatus, and more particularly to apparatus adapted to produce an electrical signal which varies in accordance with changes in the positioning of a movable element. Devices of the general type with which the present invention is concerned are shown in U.S. Patents No. 2,207,248, 2,631,272, 2,697,214 and 2,700,758.

In such devices, a movably-mounted "flux-barrier" controls the relative distribution of alternating magnetic flux between two magnetic circuit paths. Typically, the device comprises a three-legged core formed of ferromagnetic material, with the central leg having an air-gap within which the flux-barrier is arranged to move.

The operation of these devices is briefly as follows: Flux is produced by a primary winding surrounding the central leg, and secondary windings on the two outer legs develop signals in accordance with the amount of flux passing respectively through these outer legs. The secondary windings are connected in series-opposition so that, when the flux-barrier is positioned in the center of the air-gap and the flux produced by the primary winding is essentially evenly divided between the two outer legs, the individual secondary voltages will cancel to produce a "null" or zero output. As the flux-barrier is moved away from this position, the flux passing through the secondary windings is correspondingly unbalanced, with the result that the net voltage produced by the secondary windings has a finite value directly related to the position of the flux-barrier.

Devices such as are described in the above-mentioned patents have proven to be well adapted for making position measurements in a wide variety of industrial applications, particularly because of the stability and positional linearity of the output signal produced. However, when attempts have been made to employ such devices in applications requiring very high precision, some difficulties have been encountered due to the presence of small but measurable background signals in the output. These residual background signals are not wholly subject to control by the positioning of the flux-barrier and result, for example, in an imperfect cancellation of the individual secondary voltages when the barrier is in the center of the air-gap. Also, these background signals make it difficult to obtain a satisfactory null when the combined secondary voltages are balanced against an unknown voltage, e.g. as in industrial instrumentation systems.

It has been found that this problem can advantageously be solved in accordance with the present invention. In a preferred embodiment of this invention, to be described hereinbelow in detail, a pair of shiftable conductive elements are arranged to extend respectively into the regions between the central and outer legs of the magnetic core. These conductive elements apparently tend to absorb energy from the stray magnetic field around the core, e.g. due to eddy-current losses, and thereby influence the relative phases of the flux linkages passing respectively through the two secondary windings. As a result, a very clean and precise null can be obtained with this arrangement merely by making a minor screw-driver adjustment to change the positioning of one or both of the conductive elements.

Figure 2:
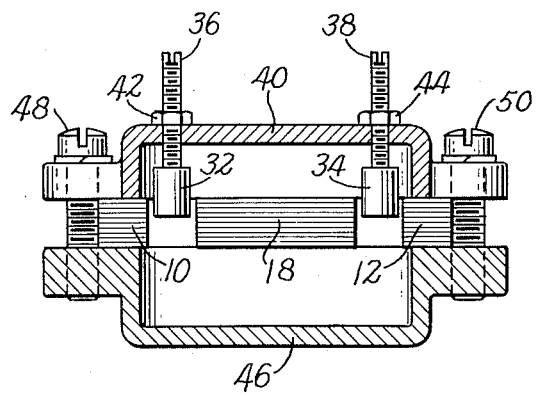

Accordingly, it is an object of this invention to provide position measuring apparatus of the type described that is superior to such apparatus provided heretofore. It is a further object of this invention to provide such apparatus with simple adjustment means adapted to permit balancing the output signal to null. Other objects, aspects and advantages of this invention will be pointed out in, or apparent from, the following description of a preferred embodiment considered together with the accompanying drawing, in which:

Figure 1 is a plan view of a position measuring device in accordance with the present invention, the device being shown in section through the top cover to permit a view of the interior structure; and Figure 2 is a cross-sectional view of this device taken along line 2—2 of Figure 1.

Referring now to the drawings, there is shown a position measuring device including a magnetic core having a pair of outer legs 10 and 12 joined at the top thereof by a curved portion 14 and joined at the bottom by a base portion 16. Integral with the base portion is a central leg 18, the remote end of which is closely adjacent to and forms an air-gap 20 with the curved portion 14.

The air-gap 20 is shaped to accommodate motion of a rotary flux-barrier 22 which comprises a closed ring of conductive material surrounding the magnetic core. This flux-barrier is mounted on a pivot axis 24 to swing freely between the ends of the air-gap, and is adapted to be coupled to any apparatus (not shown) the rotary positioning of which is to be measured by the device shown herein.

Surrounding the central leg 18 is a primary winding 26 adapted to be energized by a source of alternating current, e.g. having a frequency of 60 cycles per second. When so energized, this winding produces magnetic flux across the air-gap 20 and around the two flux paths formed by the outer legs 10 and 12. Surrounding the outer legs are respective secondary windings 28 and 30 connected in series-opposition; the combined output of these windings is fed to an electrical measuring instrument (not shown) such as a voltmeter or recorder.

When the flux-barrier 22 is in the center of the air-gap 20, the flux developed by the primary winding 26 is substantially evenly divided between the outer legs 10 and 12, so that the net output voltage produced by the secondary windings 28 and 30 will effectively be zero. As the flux-barrier is moved away from the center position, e.g. to the position shown in the drawing, more flux will pass through one of the outer legs 10 (because the reluctance of the air-gap in series with the magnetic path through that leg will be decreased) while less flux will pass through the other outer leg 12. Consequently, the voltage developed in one of the secondary windings 28 will be greater than the voltage developed in the other secondary winding 30, with the result that a finite net voltage is produced by the two secondary windings together. Furthermore, the amplitude of this voltage is a measure of how far the flux-barrier has been rotated from its center position, and the phase of this voltage is indicative of the direction of such rotation.

To achieve an essentially perfect balance at the null position, i.e. with the flux-barrier 22 in the center of the air-gap 20, the device is provided with a pair of cylindrical brass members 32 and 34 located respectively in the air spaces between the central leg 18 and the two outer legs 10 and 12, and preferably closer to the air-gap ends of these spaces than to the remote ends. These brass members are supported by corresponding brass stems 36 and 38 threaded into an upper casing wall 40. The stems are slotted at their tops to permit screw-driver adjustment of the depth of penetration of the cylindrical members 32 and 34, and are provided with lock nuts 42 and 44 to hold the stems securely in the selected positions. The members 32 and 34 may also, for certain applications, advantageously be made of magnetic material.

A typical "production line" unit of the type described herein will, after assembly has been completed, have an unbalance voltage at null of about one millivolt. By using the adjustable members 32 and 34, this one millivolt unbalance can be reduced essentially to zero merely by turning one of the stems 36 or 38 approximately four full revolutions in the correct direction. Consequently, it will be understood that the present invention provides a simple and economical solution to the problem of manufacturing position measuring devices having precise null output characteristics.

After the device has been fully assembled in production, sealing compound normally will be applied to the outer casing and magnetic core, etc., to assure that all of the various parts are fixed firmly in position. Since there generally is some minor shifting of the parts prior to and during the application of this sealing compound, and because this shifting tends to change the unbalance voltage produced at null, the practice is to make the final adjustments of stems 36 or 38 after the sealing compound has set. It is possible, of course, that the unit might be subjected to unexpected abuse during shipment or usage, with the result that the null output again becomes unbalanced; in that event, it is a simple matter subsequently to readjust one of the stems 36 or 38 to rebalance the output voltage to zero at null.

The unit shown herein also includes a lower casing member 46 which is secured to the upper casing 40 by bolts 48, 50, 52 and 54. These casing members 40 and 46 are non-magnetic and serve not only to protect the interior of the device from damage, but also to clamp the magnetic core firmly in place.

Although a preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as meet the requirements of particular applications, it being understood that various modifications may be made without departing from the scope of the invention as limited by the prior art.

I claim:

1. In apparatus for measuring physical displacement, the combination including a structure of ferro-magnetic material having first and second magnetic circuits and a third magnetic circuit common to said first and second circuits, said magnetic structure being arranged to form air-gap means coupling said third circuit to said first and second circuits, an electrically-conductive non-magnetic flux-barrier positioned to extend into said air-gap means and arranged for movement therealong, primary winding means inductively coupled to said third circuit to induce magnetic flux in said structure, said primary winding means being adapted to be connected to a source of alternating current, first and second secondary windings inductively coupled to said first and second circuits respectively, the division of said flux between said first and second circuits being a function of the position of said flux-barrier along said air-gap means so that the relative voltages induced in said secondary windings is a measure of said position, electrical-energy absorbing means positioned adjacent said magnetic structure to intercept at least a portion of the stray flux passing between said third circuit and at least one of said first and second circuits, and adjustment means for said absorbing means to vary the degree of influence thereof on said stray flux and thereby minimize the background signal level at the zero output position of said flux-barrier.

2. In apparatus for measuring physical displacement, the combination including a generally planar structure of ferro-magnetic material having first and second magnetic circuits and a third magnetic circuit common to said first and second circuits, said magnetic structure being arranged to form air-gap means coupling said third circuit to said first and second circuits, an electrically-conductive non-magnetic flux-barrier positioned to extend into said air-gap means and arranged for movement therealong, a primary winding inductively coupled to said third circuit to induce magnetic flux in said structure, said primary winding being adapted to be connected to a source of alternating current, first and second secondary windings inductively coupled to said first and second circuits respectively, the division of said flux between said first and second circuits being a function of the position of said flux-barrier along said air-gap means so that the relative voltages induced in said secondary windings is a measure of said position, an electrically-conductive element positioned adjacent said magnetic structure between said third circuit and one or the other of said first and second circuits to intercept at least a portion of the stray flux passing therethrough, and adjustment means to shift the positioning of said conductive element whereby to vary the degree of influence thereof on said stray flux and minimize the background signal level at the zero output position of said flux-barrier.

3. In apparatus for measuring physical displacement, the combination including a structure of ferromagnetic material having first and second magnetic circuits and a third magnetic circuit common to said first and second circuits, said magnetic structure being arranged to form air-gap means coupling said third circuit to said first and second circuits, an electrically-conductive non-magnetic flux-barrier positioned to extend into said air-gap means and arranged for movement therealong, a primary winding inductively coupled to said third circuit to induce magnetic flux in said structure, said primary winding being adapted to be connected to a source of alternating current, first and second secondary windings inductively coupled to said first and second circuits respectively, the division of said flux between said first and second circuits being a function of the position of said flux-barrier along said air-gap means so that the relative voltages induced in said secondary windings is a measure of said position, said secondary windings being connected in series opposition so that the net output voltage produced thereby will be minimum when said flux is evenly divided between said first and second circuits, an electrically-conductive element positioned adjacent said magnetic structure to intercept at least a portion of the stray flux passing between said third circuit one or the other of said first and second circuits, and adjustment means for altering the positioning of said element to vary the degree of influence thereof on said stray flux and thereby assure that the flux in said first and second circuits is phased to provide an effectively zero net output voltage when said flux is evenly divided therebetween.

4. In apparatus for measuring physical displacement, the combination including a three-legged magnetic core having a central leg and a pair of outer legs forming first and second magnetic circuits and a third magnetic circuit common to said first and second circuits, said central leg being formed with an air-gap coupling said third circuit to said first and second circuits, an electrically-conductive non-magnetic flux-barrier positioned to extend into said air-gap and arranged for movement therealong, a primary winding inductively coupled to said central leg to induce magnetic flux in said core, said primary winding being adapted to be connected to a source of alternating current, first and second secondary windings inductively coupled to said outer legs respectively, the division of said flux between said outer legs being a function of the position of said flux-barrier along said air-gap so that the relative voltages induced in said secondary windings is a measure of said position, an electrically-conductive piece positioned adjacent said magnetic core between said central leg and one of said outer legs to influence the stray flux passing between said central leg and said one outer leg, and adjustment means for moving said piece relative to said central leg to vary the degree of influence of said piece on said stray flux.

5. In apparatus for measuring physical displacement, the combination of a three-legged magnetic core having a central leg and two outer legs joined together by top and bottom portions, said core being ararnged to form an air-gap between one end of said central leg and said bottom portion, an electrically-conductive non-magnetic flux-barrier positioned to extend into said air-gap and arranged for movement therealong, a primary winding wound on said central leg to induce magnetic flux in said core, said primary winding being adapted to be connected to a source of alternating current, first and second secondary windings inductively coupled to said outer legs respectively with said secondary windings being connected in series-opposition, the division of said flux between said outer legs being a function of the position of said flux-barrier along said air-gap means so that the relative voltages induced in siad secondary windings is a measure of said position, first and second electrically-conductive elements positioned to penetrate into the regions between said central leg and said outer legs respectively to influence the stray flux passing between said central leg and said outer legs, and individual adjustment means for said elements to vary the depth of penetration thereof into said regions whereby to vary the degree of influence thereof on said stray flux and assure that the net voltage developed in said secondary windings is essentially zero for a predetermined position of said flux-barrier.

References Cited in the file of this patent

UNITED STATES PATENTS

| 2,598,467 | Van Yzeren | May 27, 1952 |
| 2,631,272 | Smith | Mar. 10, 1953 |
| 2,737,624 | Muller | Mar. 6, 1956 |
| 2,758,288 | Shannon | Aug. 7, 1956 |

FOREIGN PATENTS

| 435,884 | Great Britain | Oct. 1, 1935 |